Jan. 28, 1936.  W. H. HOLDEN  2,028,867
SHEARS AND SCISSORS
Filed May 10, 1935
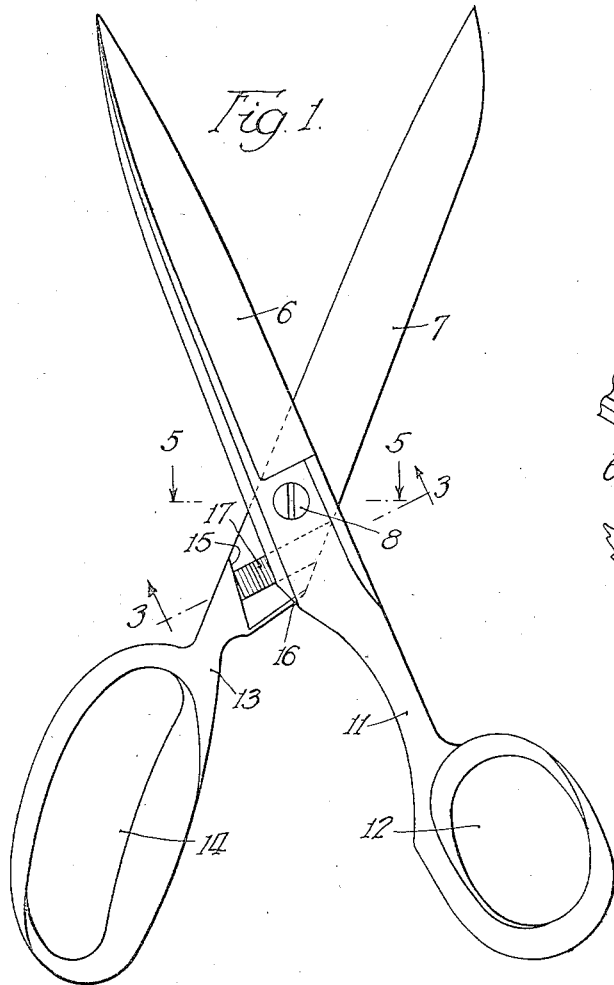
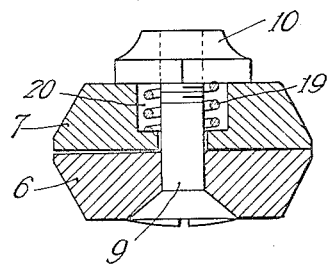
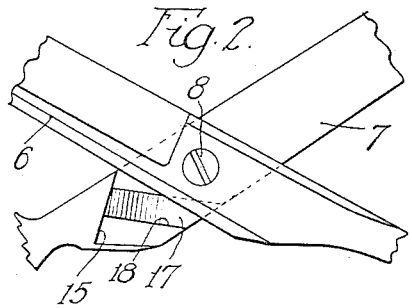
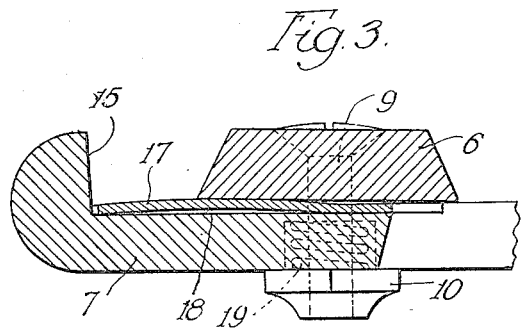
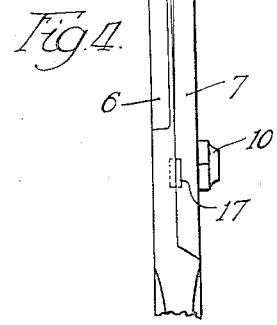
Inventor
William H. Holden
By Zabel Carlson & Wells Attys.

Patented Jan. 28, 1936

2,028,867

UNITED STATES PATENT OFFICE 2,028,867

SHEARS AND SCISSORS

William H. Holden, Boise, Idaho

Application May 10, 1935, Serial No. 20,749

1 Claim. (Cl. 30—13)

This invention relates to improvements in shears and scissors, and, while I shall hereafter refer to the device as shears, it is to be understood that the term is also intended to cover scissors which are defined in Webster's dictionary as devices which "work like shears but are smaller".

It is the principal purpose of this invention to provide an improved means of maintaining the cutting edges of shears in snug contact in all cutting positions even though the pivotal connection of the two blades of the shears is worn to such an extent as to permit considerable play.

It is a further purpose of this invention to provide, as a means for producing the above result, a novel structure wherein resilient means is interposed between the two blades on the portion between the handles and the pivotal connection thereof in such a fashion as to tend to urge the cutting edges of the blades toward each other with a slight tilting tendency of one blade with respect to the other.

It is a further purpose of the invention to combine with the aforementioned resilient means a second resilient member tending to yieldingly urge the two blades flatly together at their pivotal connection whereby, in the operation of the blades regardless of the wear at the pivotal connection there is always a sufficient force urging the cutting edges toward each other to cause the blades to properly operate and not spread apart to wedge the material between them.

I will describe the preferred form of the invention by reference to the accompanying drawing wherein—

Fig. 1 is a plan view of a pair of shears embodying the invention;

Fig. 2 is a similar view showing the blades in a slightly different position with respect to each other;

Fig. 3 has an enlarged sectional view taken on the line 3—3 of Fig. 1;

Fig. 4 is a side view showing the shears in closed position; and

Fig. 5 is an enlarged sectional view taken on the line 5—5 of Fig. 1.

Referring now in detail to the drawing, I will designate two cutting blades of the shears as number 6 for the top blade and number 7 for the bottom blade. The two blades are secured together by a suitable securing device 8 which in the present instance is a screw 9 held in place by a nut 10. It is to be understood, of course that any suitable securing means may be substituted for the screw and nut described. The top blade 6 has a handle portion 11 provided with a thumb hole 12, while the bottom blade 7 has its handle portion 13 provided with a finger opening 14. This is common in shears. It is also common to provide in shears shoulders 15 and 16 which are adapted to be brought together when the blades of the shears are closed.

One feature of my invention consists in the provision between the shoulders 15 and 16 and the pivotal point of the shear blades a flat spring 17 which, as shown most clearly in Fig. 3, is seated in a slot 18 in the bottom blade 7. This spring is bowed upwardly intermediate its ends, and the length is just such that, when it is flattened down in the slot 18, the free end adjacent the shoulder 15 will just about contact this shoulder. At its other end, the spring 17 is welded or otherwise suitably secured to the bottom blade 7.

It will be noted, from an inspection of Figs. 1 and 2, that the spring 17 is considerably closer to the pivotal connection of the blades at the end where it is secured to the blade 7 than it is at the other end. Thus, when the shears are in the open position shown in Fig. 1, which is the usual starting position for cutting, the top blade 6 is almost at right angles to the spring 17 and the outside edge of the blade 6—namely, the edge opposite the cutting edge rides directly upon the bowed up portion of the spring 17. This tends to tip the top blade with respect to the bottom blade and to urge the cutting edge of the top blade directly against the bottom blade so that, in the initial cutting action, the spring 17 not only tends to tilt the two blades together along their cutting edges, but also tilts the cutting edge of the top blade toward the flat surface of the bottom blade. As the blades are brought together during the cutting operation, the engaging surfaces between the spring and the top blade are spaced farther away from the pivotal axis of the blades thus increasing the leverage as the point of actual cutting recedes from the pivotal point. The increase in leverage obtained this way is sufficiently equal to the increase in distance of the cutting point away from the pivotal axis of the shears to supply ample pressure and perfect contact between the cutting edges to prevent their separation and thus insure at all times a perfect cutting position of the top and bottom blades.

To further aid in maintaining proper contact between the blades, I provide means whereby the two blades may be pressed together at the pivotal point regardless of the amount of wear occasioned upon the screw 9 by the continued use of the shears. This means consists of the coil spring 19

(see Fig. 5) which is mounted in a recess 20 in the bottom blade 7 and held in place by the nut 10. The general function of this spring 19 is self evident from the drawing. It tends to take up any play between the blades and hold them together even though considerable wear has taken place. It performs further the additional service of preventing excessive pressure between the blades before they are worn due to the moving of the top blade 6 over the spring 17. By this combination, I am able to obtain the proper contact between the cutting edges of the blades both when the shears are new and after they have been worn by continued use.

As is evident from the drawing, and particularly Figs. 3 and 5, the shears are so made that at the outset (without waiting for wear) sufficient play or tolerance is provided by the screw 9 with respect to the blade 7 to permit the two springs 17 and 19 to operate freely in combination with each other to bring the cutting edges of the shears into proper cutting positions at all times. This result is not obtainable by the use of either of these springs alone. It cannot be obtained without the play permitted between the screw and the blades and the combined action of the two springs in yieldingly forcing the cutting edges of the shears together. The coil spring 19, which is seated in the blade 7 around the screw 9, pulls down on the blade 6 bringing it into snug position against the blade 7. Then, when the shears are closed for cutting, the flat spring 17, due to the tolerance or play controlled and utilized by the coil spring 19, goes into action. The flat spring 17, being able to exert a greater force on the blades than the coil spring 19 and being in position to engage the back edge of the blade 6, tilts the blades with respect to each other to bring the cutting edge of the blade 6 directly against the blade 7. Thus there is produced a coordinated synchronization of power and action of the two springs, within the tolerance ever present at the pivot, which compels perfect cutting contact of the blades for the full length of their cutting edges.

From the above description, it is believed that the construction and operation of this device will be clear to those skilled in this art and the advantages thereof readily apparent.

Having thus described one specific form of my invention, what I claim as new and desire to secure by Letters Patent is:

A pair of shears having two blades, a pivot member pivotally connecting the two blades together, said blades having a limited amount of play on said pivot member so that one blade may tip sidewise or endwise with respect to the other, means cooperating with said pivot member to yieldingly oppose said tipping movement and to urge said blades together, and spring means interposed between said blades between the pivotal connection of the blades and the handle ends thereof adapted to tip the cutting edges of said blades sidewise and endwise toward each other against the opposition of said first named means.

WILLIAM H. HOLDEN.